Nov. 22, 1966  F. KRAISSL, JR  3,286,843
SELF-CLEANING FILTER
Filed Aug. 20, 1965
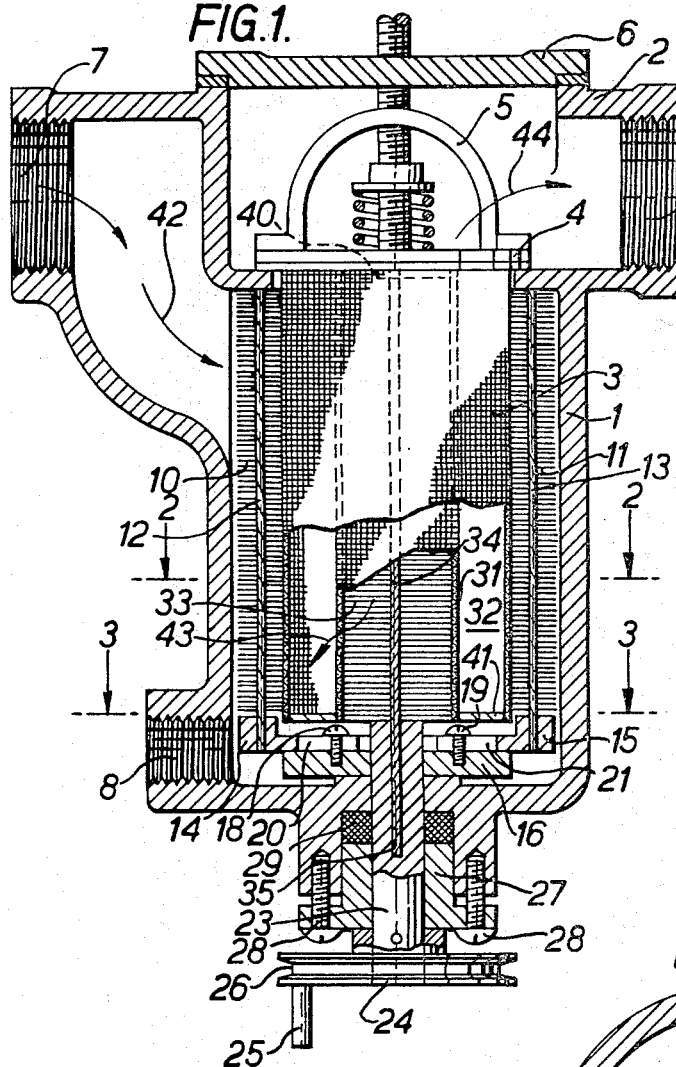
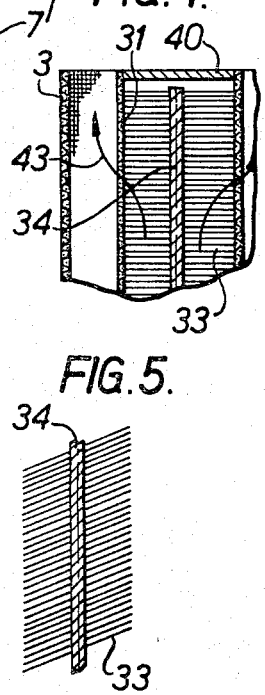
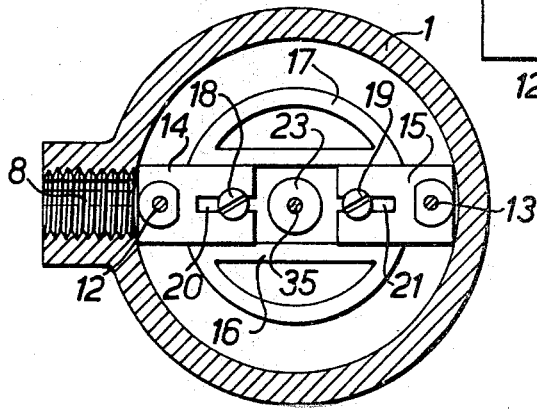
INVENTOR
Frederick Kraissl, Jr.
BY
Bierman & Bierman
ATTORNEYS

United States Patent Office 3,286,843
Patented Nov. 22, 1966

3,286,843
SELF-CLEANING FILTER
Frederick Kraissl, Jr., 244 Kinder Kamack Road,
North Hackensack, N.J.
Filed Aug. 20, 1965, Ser. No. 481,317
3 Claims. (Cl. 210—332)

The present invention is directed to the filtering of solid matter suspended in liquids, and more particularly to such devices as are used to filter fuel oils, lubricating oils, water, and aqueous solutions to free them from matter suspended therein which would be harmful or undesirable for the intended service. This application is a continuation-in-part of my co-pending application Ser. No. 234,260, filed October 30, 1962, now abandoned.

Filters or strainers of this type have previously been used and while they have accomplished the purpose, there are a number of disadvantages inherent therein. Such filters or strainers, which may be termed "separators," required frequent cleaning and since they usually embodied perforated metal, sintered material or a fine mesh screen, damage thereto occurred during the removal, cleaning and replacement thereof in the filter.

Due to the fact that solid matter accummulated on the screen, a back pressure was built up during the circulation of the liquid through the filter, which interfered with the operation thereof. Attempts have been made to correct these deficiencies, and various arrangements for accomplishing this have been proposed. While they were successful, the operation required interruption of the separating, filtering or straining process with single units for cleaning or the use of a duplex assembly so that one side could be cleaned while the other was in service.

One such prior art device which had a cage within the casing on which were mounted a plurality of concentric filters. Brushes were located adjacent the filters and were mounted at the top on a spider. Extending through the top of said casing was a spider to which the brushes were attached. Means on the top of the cover were provided for rotating the spider and brushes. The filters could not be removed for repair or replacement without complete dismantling.

In another proposed device in the nature of a vacuum cleaner, there was provided near the bottom of the casing a support or base, to opposite sides of which were fixed brushes and an additional brush was fixed on the support. A shaft had its lower end secured in the support and it extended out of the top of the casing. A strainer surrounding the shaft and in contact with the brushes was securely fastened into the top of the casing. In order to remove the strainer, it was necessary to remove the cover and raise the shaft, whereby the brushes, the support, the strainer and shaft all were removed as a unit. It was not possible to remove the strainer without disturbing the brush arrangement.

Another prior art device had a motor suspended in the case from the cover, on which a blower was mounted. Surrounding the motor was a conical shaped filter in cross-section, the filter being secured at the bottom to a ring, which was rotated by rods extending through the sides of the casing. In order to gain access to the filter it was necessary to remove the cover with blower and motor. But the filter could not be removed as it was secured at the bottom to the casing and springs at the top fixed it to the top of the casing.

The present invention is intended and adapted to overcome the difficulties and disadvantageous inherent in prior devices of the type described, it being among the objects of the present invention to provide a structure which will make unnecessary the frequent dismantling of the filter and the removal of the strainer therefrom.

It is also among the objects of the present invention to provide a structure of filter which avoids to a great extent the building up of back pressures in the circulating liquid, and which will facilitate such flow and increase the efficiency of removal of solid matter therefrom.

It is further among the objects of the present invention to provide a structure which is self-cleaning, which does not interfere with the normal functioning of the filter and which is readily removable for replacement purposes.

In practicing the present invention, there is provided a casing within which the filter-separator element (filter or strainer) is held, said casing having a suitable inlet for the circulation of the liquid, with means for causing the flow thereof through the strainer, and provided with an exit for the filtered and purified liquid. The strainer can be of a metal mesh, perforated metal, sintered metal, porous ceramic or metals and the like and/or non-metallic membranes and is mounted in the casing so that it is removable through an opening provided therein.

According to the invention, there is further provided within the casing one or more brushes so located that they make contact with either the inner or outer surface of the separator element. The brush or brushes are mounted on a suitable base, which is in turn adapted for rotation either manually or by a motor. Upon rotation thereof, the brushes sweep along the surface of the separator element, dislodging solid matter therefrom which falls downwardly and may be removed from the separator element even without dismantling the same. Preferably the structure of each brush is such that the bristles have a pitch similar to that of a conveyer screw so that the effect thereof is to direct or drive the solid matter towards the bottom of the casing or housing.

The invention is more fully described in the accompanying drawings forming a part hereof, in which like reference characters indicate like parts, and in which—

FIG. 1 is a vertical cross-sectional view of a filter made in accordance with the present invention, some parts being shown in elevation for clearness;

FIG. 2 is a transverse cross-sectional view of the filter taken along line 2—2 of FIG. 1;

FIG. 3 is a transverse cross-sectional view thereof taken along line 3—3 of FIG 1;

FIG. 4 is a fragmentary cross-sectional view of the upper left hand corner of the separator element showing the direction of flow of fluid; and FIG. 5 is a fragmentary view of a brush showing the pitch of the bristles.

There is provided a casing 1 for the filter, the casing being shown as cylindrical. In top 2 is an opening, the diameter of which is such that strainer 3 can be readily inserted or removed. Strainer 3 is attached to plate 4, having handle 5 thereon to facilitate removal of strainer 3. Cover 6 and associated elements is provided with means for sealing and retaining the strainer assembly, as shown in applicant's prior Patent No. 2,982,413, dated February 20, 1959, and entitled "Filter Unit for Liquids." The casing has an entrance opening 7 at the upper end thereof for liquid to be cleaned and a further opening 7' for exit of the purified liquid. It has an exit opening 8 at the lower end thereof for the removal of the impurities which were removed from the liquid.

Along the outer face of strainer 3 is a brush 10 consisting of a series of bristles fixed to a central core of twisted wire. Diametrically opposite brush 10 is a similar brush 11 also contacting the outer surface of strainer 3. The twisted wire cores 12 and 13 of brushes 10 and 11 extend below the strainer and are anchored in arms 14 and 15, respectively. A base 16 below arms 14 and 15 has means for assembling said arms thereon.

Said base also has an arm 17 for strengthening purposes and provides openings through which oil may flow.

Set screws 18 and 19 in alinement with each other, and cores 12 and 13 are tapped into base 16. The inner ends of arms 14 and 15 are provided with slots 20 and 21, respectively, through which the shanks of set screws 18 and 19 are adapted to pass.

Base 16 is mounted on shaft 23 at the lower end of which is a wheel 24 having a handle 25 thereon to provide means whereby the shaft may be rotated manually. Wheel 24 may have a groove 26 for the reception of a belt so that it may be connected to a suitable motor. Gland 27 surrounding shaft 23 is held in place by set screws 28 which compress packing 29 to form a leak-proof joint.

It is desirable in many instances to provide a double filter and there is mounted a second separator 31 concentric with separator 3, leaving an annular space 32 between the separator elements. The lower end of the annular space 32 is closed by an impermeable means 41 as shown in FIG. 1. The upper end of the space within the inner separator 31 is closed by an impermeable means 40 as shown in FIG. 4. Brush 33 which may have a pitch similar to brushes 10 and 11, has a twisted wire core 34, the lower end 35 of which is fixed in shaft 23. Thereby all the brushes 10, 11 and 33 may be rotated simultaneously.

In the operation of the device, a liquid such as a lubricating oil to be cleaned is circulated by passing the same through inlet 7 as shown by arrows 42, then through separators 3 and 31 as shown by arrow 43 where solid matter suspended in the oil is deposited thereon, the purified oil then emerging from exit 7' as shown by arrow 44. At suitable intervals, handle 25 is rotated, thereby causing rotation of brushes 10 and 11 through the connection with arms 14 and 15 and brush 33, which contacts the inner surface of strainer 31. The solid matter thus removed falls downwardly and may be flushed out through exit 8.

In order to remove separator element 3 and/or separator element 31, cover 6 is removed and the elements raised through the opening in the top of the casing by means of handle 5. This frees brushes 10, 11 and 33. In order to remove the brushes, since the opening is too narrow to allow the lifting thereof through the opening, set screws 18 and 19 are loosened and arms 14 and 15 are moved inwardly until brushes 10 and 11 clear the opening. Brushes 10 and 11 may then be removed by pulling upwardly thereon, thus removing the lower end of cores 12 and 13 or by removing set screws 18 and 19 completely and lifting the brushes and the arms to which they are attached. Similarly brush 33 may be raised, causing core 34 to be separated from shaft 23.

While the invention has been described setting forth a single specific embodiment thereof, various changes in the details may be made within the spirit of the invention. For instance, a different type of mounting of base 16 for rotation may be used. The inlet and outlet for liquid may be placed differently from that shown in the drawing. The form of strainers and separator elements 31 may be varied and instead of cylindrical may be spherical, and conical or other shapes which are surfaces of revolution, and brushes 10 and 11 may be so formed as to conform with the exterior surface of strainer 3. Similarly strainer 31 will have a brush 33 conforming with the shape thereof. These and other changes may be made within the scope of the invention, which is to be broadly construed and not to be limited except by the character of the claims appended hereto.

I claim:

1. A self-cleaning separator comprising a casing, a lateral inlet and a lateral outlet for fluid adjacent the upper end thereof, a substantially cylindrical separator in said casing, an opening in the top of said casing, the diameter thereof being at least equal to that of said separator, a base below said separator, a shaft extending downwardly from said base and axial with respect to said separator, means attached to said shaft outside of said casing for rotating said shaft, said separator having outer and inner cylindrical members concentric with each other and defining an annular space therebetween, an inner central brush in said inner member attached to said shaft on said axis and contacting said inner member, radial arms extending laterally from said base, and outer brushes on the ends of said arms contacting the outer face of said outer member first impermeable means closing the lower end of said annular space, second impermeable means closing the upper end of said inner member, said inlet communicating with the outer face of said outer member and the inner face of said inner member, said outlet communicating with said annular space, and means at the top of said separator for lifting the same from the casing without displacing said brushes.

2. A self-cleaning separator according to claim 1 in which said arms are radially adjustable.

3. A self-cleaning separator according to claim 1 in which each of said brushes has a vertical rigid core and the bristles thereof extend radially from said core and said bristles are inclined with respect to said core to cause particles loosened by said brushes to be thrust downwardly.

References Cited by the Examiner

UNITED STATES PATENTS

| 651,621 | 6/1900 | Black et al. | 210—415 X |
| 672,003 | 4/1901 | Lynn | 210—415 |
| 2,408,741 | 10/1946 | Dodge | 210—355 |
| 2,598,322 | 5/1952 | Vokes | 210—332 X |
| 2,792,118 | 5/1957 | Kraissl | 210—238 |
| 2,968,055 | 1/1961 | Linderoth | 15—206 X |
| 2,982,413 | 5/1961 | Kraissl | 210—131 |

FOREIGN PATENTS 80,305  4/1895  Germany.

REUBEN FRIEDMAN, *Primary Examiner.*

SAMIH ZAHARNA, *Examiner.*